Jan. 12, 1932. C. G. MUNTERS 1,841,293
ABSORPTION REFRIGERATING APPARATUS
Filed Oct. 8, 1928 2 Sheets-Sheet 2

INVENTOR
Carl Georg Munters
By Wm J. Hedlund
his ATTORNEY

Patented Jan. 12, 1932

1,841,293

UNITED STATES PATENT OFFICE

CARL GEORG MUNTERS, OF STOCKHOLM, SWEDEN, ASSIGNOR TO ELECTROLUX SERVEL CORPORATION, OF NEW YORK, N. Y., A CORPORATION OF DELAWARE

ABSORPTION REFRIGERATING APPARATUS

Application filed October 8, 1928, Serial No. 310,985, and in Sweden October 11, 1927.

My invention relates to the art of refrigeration and particularly to refrigerating apparatus of the absorption type and still more particularly to apparatus of this type wherein refrigerant evaporates in the presence of an inert gas and in which circulation of the fluids results entirely from forces generated within the system.

One of the objects of my invention is to provide improved means for producing such a circulation of certain of the fluids in a desired direction.

Further objects and advantages will appear from the following description considered in connection with the accompanying drawings which form a part of this specification and on which:

Figure 1:
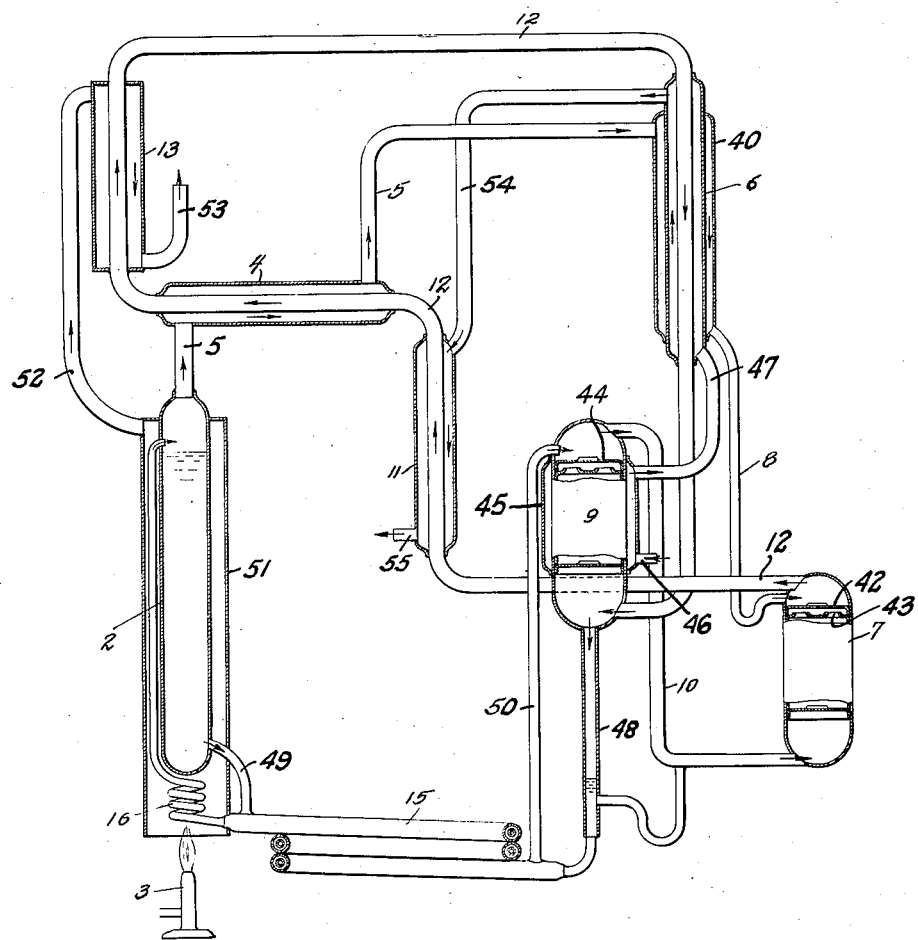
Fig. 1 is a more or less diagrammatic elevational view, partly in cross-section, of a preferred embodiment of my invention.

Referring more particularly to Fig. 1, reference character 2 designates a generator which is arranged to be heated in any suitable way as, for instance, by the gas burner 3. A conduit 5 connects the upper part of generator 2 with the upper part of a condenser jacket 40. A portion of conduit 5 is in the form of a rectifier jacket 4. Jacket 40 is formed around a water jacket 6 through which cooling water is circulated. A conduit 8 connects the lower part of condenser jacket 40 with the upper part of an evaporator 7.

Evaporator 7 comprises a closed cylindrical member in which is positioned a series of discs 42 in which are formed apertures 43. A conduit 10 connects the lower part of evaporator 7 with the upper part of an absorber 9. Absorber 9 likewise comprises a closed cylindrical vessel in which is positioned a series of discs 44 which may be similar to discs 42 in the evaporator. Absorber 9 is partially surrounded by a water jacket 45 which is supplied with cooling water from any suitable source through a conduit 46. From jacket 45 the cooling water passes through a conduit 47 to water jacket 6.

A conduit 12 communicates with the upper part of evaporator 7 and extends in a generally upwardly direction through a heating water jacket 11, rectifier jacket 4 and a heating gas jacket 13 and thence in a generally downwardly direction through cooling water jacket 6 and communicates with the lower part of absorber 9. If desired, conduit 10 may be brought into heat-exchange relationship with a portion of conduit 12 between evaporator 7 and heating water jacket 11.

A conduit 48 communicates with the bottom of absorber 9, extends in the form of a liquid heat exchanger 15 and a thermo-siphon coil 16 and communicates with the upper part of generator 2. A conduit 49 connects the lower part of generator 2 with the outer member of heat exchanger 15 and a conduit 50 connects the other end of this member with the upper part of absorber 9.

Arranged around generator 2 is a shell 51. A flue 52 connects the upper part of shell 51 with the upper part of gas heating jacket 13. Another flue 53 communicates with the lower part of jacket 13 and leads to any suitable place for the disposal of the products of combustion.

A conduit 54 connects the upper part of cooling water jacket 6 with the upper part of heating water jacket 11 from whence the water passes to waste through a conduit 55. The apparent incongruity that might seem to arise from having a cooling water jacket connected directly in series to a heating water jacket so that the same water flows through both is explained when it is realized that a substance at a given temperature will heat another substance at a lower temperature or cool one at a higher temperature.

The operation of this form of the apparatus is as follows:

A solution consisting of a refrigerant, such as ammonia, dissolved in an absorption liquid, for instance water, is contained within generator 2. The application of heat thereto from heater 3 serves to drive ammonia from solution in the form of a gas and also vaporizes some of the water. The mixed vapors of ammonia and water pass through conduit 5 to rectifier jacket 4 where they flow counter-current to cold gas within conduit 12. An exchange of heat here takes place which results in the condensation of the water which runs back to the generator. The pure ammonia vapor passes to condenser jacket 40 where it is further cooled and is liquefied by the cooling water in water jacket 6. The liquid ammonia flows from jacket 40 through conduit 8 to the upper part of evaporator 7.

In the evaporator the liquid ammonia comes in intimate contact with a gas inert with respect to ammonia, for instance hydrogen, which is admitted at the lower part of the evaporator through conduit 10. The ammonia evaporates in well known manner in the presence of the hydrogen and refrigeration results. The cold mixture of ammonia and hydrogen vapor thus formed in the evaporator passes from the upper part thereof through conduit 12 to the lower part of absorber 9.

In the absorber the mixture of ammonia and hydrogen comes in contact with absorption liquid containing but little ammonia in solution which is admitted through conduit 50. This absorption liquid absorbs the ammonia vapor but the hydrogen is not absorbed and passes from the upper part of the absorber through conduit 10 to the evaporator.

The circuit for the circulation of vapors between the evaporator and absorber comprises, besides their two members, conduits 10 and 12. Due to the fact that the specific weight of ammonia is greater than that of hydrogen, there is a natural tendency for the heavy mixture to collect in the lower part of the evaporator. In order to overcome this tendency and to produce a continuous circulation in the desired direction conduit 12 is made in the general form of an inverted U. The leg of this U through which it is desired to have gas pass upwardly is heated to expand the gas and thus reduce its specific weight, while the other leg is cooled to contract the gas and thus increase its specific weight. Hence, an unbalanced condition is made to exist which results in a flow of gas upwardly through the heated leg and downwardly through the cooled leg.

The heating of the former leg is shown in Fig. 1 as being accomplished in three stages. First the cold mixture leaving evaporator 7 is passed in heat exchange relationship with water in heating water jacket 11. This water has previously served to cool the absorber, condenser and the other leg of the U and has thus become heated.

The mixture in conduit 12 is further heated by coming in heat exchange relationship with the hot gases from the generator in rectifier jacket 4. The exchange of heat here taking place serves the double purpose of heating the mixture in conduit 12 and condensing the water vapor in the jacket.

The third heating of the mixture in conduit 12 occurs when it is brought in heat exchange relation with the products of combustion from burner 3 within gas heating jacket 13. It will be noted that each of these heat exchange devices is so arranged that counter-flow of the heat exchanging fluids takes place therethrough.

The heat thus imparted to the gases flowing upwardly through conduit 12 is taken from the gases in their passage through the downwardly extending portion of the conduit which is within cooling water jacket 6. Here again, the fluids are arranged for counter-flow.

The flow of the gaseous mixture thus produced in conduit 12 results in a continuous circulation upwardly through absorber 9, downwardly through conduit 10 and upwardly through evaporator 7. It is this upward flow of the hydrogen through the evaporator which is one of the objects of this invention as it results in a more efficient evaporation of the ammonia than if the hydrogen entered at the top and flowed downwardly.

The strong solution of ammonia and absorption liquid formed in absorber 9 flows from the bottom thereof through conduit 48 to coil 16 where it is heated and raised by percolator action to the upper part of generator 2. Here ammonia is driven from solution, as previously described, and the weak solution flows from the lower part of the generator through conduit 49, heat exchanger 15 and conduit 50 to the upper part of absorber 9. In heat exchanger 15 the comparatively cool strong solution in conduit 48 is in heat exchange relation with the warmer weak solution in the outer jacket.

Figure 2:
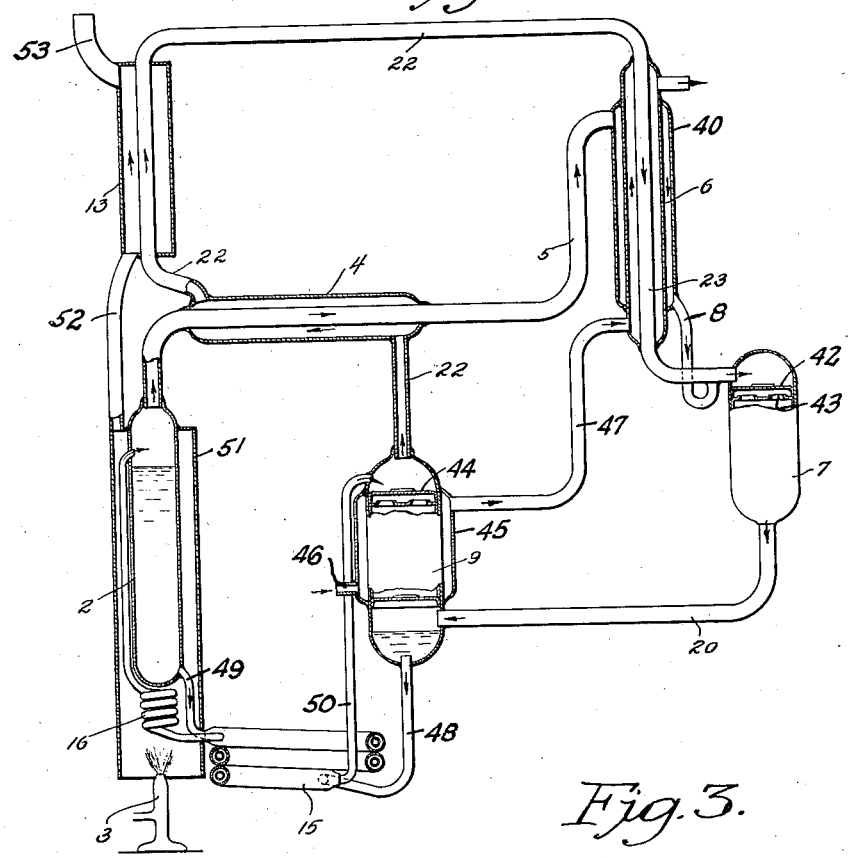
Fig. 2 is a more or less diagrammatic elevational view, partly in cross-section, of another embodiment of my invention.

The modification shown in Fig. 2 differs from that shown in Fig. 1 in that in the former the lower part of the evaporator is connected to the lower part of the absorber and the upper parts of the two vessels are connected together instead of the upper part of each being connected to the lower part of the other, as is the case in Fig. 1.

Thus, a conduit 20 connects the lower part of evaporator 7 with the lower part of absorber 9. A conduit 22 communicates with the upper part of absorber 9 and is arranged in heat exchange relation with conduit 5, as at 4, which corresponds to rectifier 4 in Fig. 1. Conduit 22 then extends upwardly within heating gas jacket 13 and thence downwardly within cooling water jacket 6 and communicates with the upper part of evaporator 7.

The operation of this modification of my invention is similar to that described in connection with Fig. 1 with the exception of the gas circulation between and through the evaporator and absorber. Here both the liquid ammonia and the hydrogen is admitted at the top of the evaporator and the heavy mixture of gases resulting from the evaporation of the ammonia has a natural tendency to flow downwardly through the evaporator and through conduit 20 to the absorber. Here the ammonia is absorbed and the lighter hydrogen will pass upwardly through conduit 22 to the evaporator. In order to increase the tendency for circulation in this direction conduit 12 is made in the general form of an inverted U, the upwardly extending leg of which is heated in rectifier 4 and heating gas jacket 13, while the downwardly extending leg is cooled by cooling water jacket 6. Thus the gas in the inwardly extending leg is expanded and made specifically lighter while that in the other leg is contracted and made heavier and hence the natural tendency for circulation from the upper part of the absorber to the upper part of the evaporator is aided and increased.

Figure 3:
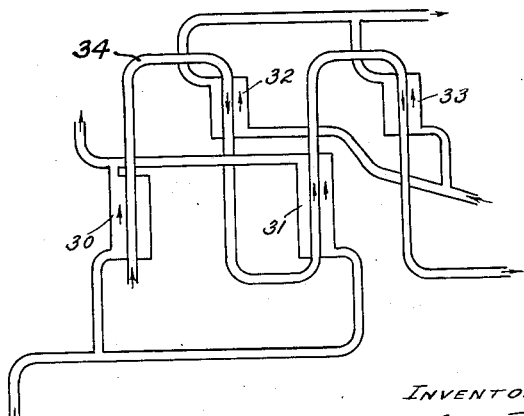
Fig. 3 is a diagrammatic view of a modification of my invention which may be used in conjunction with apparatus shown in either Figs. 1 or 2.

In Fig. 3 is shown diagrammatically a portion of a refrigerating apparatus wherein a strong circulation of gas is obtained while limiting the height of the apparatus.

Conduit 34, which corresponds to conduit 12 of Fig. 1 or conduit 22 of Fig. 2, is formed in a plurality of inverted U's, two being here shown. The upwardly extending leg of each U is heated, as by hot gases passing through jackets 30 and 31 while each of the downwardly extending legs is cooled, as by cooling water in jackets 32 and 33. This arrangement will give as strong a circulation as would one inverted U of twice the height of either of the ones used. Thus a strong circulation may be obtained in an apparatus having a comparatively small over-all height. This use of a plurality of inverted U's may be used in connection with the apparatus shown in either Figs. 1 or 2.

While I have shown more or less specific modifications of my invention for the purpose of illustration, it is to be understood that I am to be limited only by the appended claims.

What I claim is:

1. That improvement in the art of refrigeration through the agency of an absorption apparatus including an evaporator and a circulating system for an inert gas which comprises heating said gas in an ascending leg and cooling it in a descending leg of the circulating system, and causing said gas to flow upwardly through the evaporator counter-current to liquid refrigerant passing therethrough due to said heating and cooling thereof.

2. That improvement in the art of refrigeration through the agency of an absorption system including a generator, an evaporator, and members forming a circulating system for an inert gas which comprises heating the generator to expel refrigerant vapor from solution, causing the inert gas to flow in an ascending leg of said system in heat exchange relation with the vapor produced in the generator to heat said gas and to rectify said vapor, cooling said inert gas in a descending leg of said system and producing circulation of said inert gas in the evaporator in counter-current to liquid refrigerant due to said heating and cooling thereof.

3. That improvement in the art of refrigeration through the agency of an absorption system including a generator, an evaporator, members forming a circulating system for an inert gas and means for cooling the system by an outside medium which comprises heating the generator to expel refrigerant vapor from solution, causing the inert gas to flow the vapor produced in the generator to heat exchange relation with said cooling medium after being heated by the system and with the vapor produced in the generator to heat said gas and to rectify said vapor, cooling said inert gas in a descending leg of said system and producing circulation of said inert gas in the evaporator in counter-current to liquid refrigerant due to said heating and cooling thereof.

4. That improvement in the art of refrigeration through the agency of an absorption system including a generator, an evaporator, members forming a circulating system for an inert gas and means for cooling the system by an outside cooling medium which comprises heating the generator to expel refrigerant vapor from solution, causing the inert gas to flow in an ascending leg of said system in heat exchange relation with said cooling medium after being heated by the system and with hot gases previously used to heat the generator and with the vapor produced in the generator to heat said gas and to rectify said vapor, cooling said inert gas in a descending leg of said system and producing circulation of said inert gas in the evaporator in counter-curent to liquid refrigerant due to said heating and cooling thereof.

5. The method of effecting circulation of an inert gas in an absorption refrigerating apparatus including a generator heated by an external source of heat which comprises heating the inert gas in a plurality of ascending legs of the circulating system by means of hot waste gases from the heating device of the generator and cooling the inert gas in a plurality of descending legs of the circulating system.

6. The method of effecting circulation of an inert gas through the evaporator and absorber of an absorption refrigerating apparatus including a generator heated by an external source of heat which comprises heating said inert gas in an ascending branch of the circulating system by passing it in heat exchange relation and counter-flow to vapors of absorption liquid and refrigerant produced in the generator of the apparatus.

7. The method of effecting circulation of an inert gas in an absorption refrigerating apparatus which comprises heating the gas to produce an upwardly directed force by a fluid that has been heated in cooling heat giving parts of the apparatus.

8. An absorption refrigerating apparatus comprising, in combination, an evaporator, an absorber, conduits connecting said evaporator with said absorber and arranged for the circulation of an inert gas therethrough, one of said conduits being in the form of an inverted U and means to heat one leg of said U for producing circulation of inert gas upwardly through said evaporator in counter-flow to the passage of liquid refrigerant therethrough.

9. An absorption refrigerating apparatus comprising, in combination, an evaporator, an absorber, conduits connecting said evaporator with said absorber and arranged for the circulation of an inert gas therethrough, one of said conduits being in the form of an inverted U and means to heat one leg and cool the other leg of said U for producing circulation of inert gas upwardly through said evaporator in counter-flow to the passage of liquid refrigerant therethrough.

10. Absorption refrigerating apparatus comprising a generator, an absorber and an evaporator interconnected to form a system for circulating a refrigerant, an absorption liquid and an inert gas, means to heat the generator to expel refrigerant from solution therein, and said system including means to circulate gas in counter-flow to liquid refrigerant in the evaporator comprising a conduit in the form of an inverted U forming a part of the circulating system and heat exchange means between one leg of said U and vaporous refrigerant produced in the generator.

11. Absorption refrigerating apparatus comprising a generator, an absorber and an evaporator interconnected to form a system for circulating a refrigerant, an absorption liquid and an inert gas, means to heat the generator to expel refrigerant from solution therein, and said system including means to circulate gas in counter-flow to liquid refrigerant in the evaporator comprising a conduit in the form of an inverted U forming a part of the circulating system, heat exchange means between one leg of said U and vaporous refrigerant produced in the generator and means to cool the other leg of said U.

12. Absorption refrigerating apparatus comprising a generator, an absorber and an evaporator interconnected to form a system for circulating a refrigerant, an absorption liquid and an inert gas, means to heat the generator to expel refrigerant from solution therein, and said system including means to circulate gas in counter-flow to liquid refrigerant in the evaporator comprising a conduit in the form of an inverted U forming a part of the circulating system, heat exchange means between one leg of said U and vaporous refrigerant produced in said generator and means to heat said leg by heat from the generator heating means.

13. Absorption refrigerating apparatus comprising a generator, an absorber and an evaporator interconnected to form a system for circulating a refrigerant, an absorption liquid and an inert gas, means to heat the generator to expel refrigerant from solution therein, and said system including means to circulate gas in counter-flow to liquid refrigerant in the evaporator comprising a conduit in the form of an inverted U forming a part of the circulating system, heat exchange means between one leg of said U and vaporous refrigerant produced in said generator, means to heat said leg by heat from the generator heating means and means to cool the other leg of said U.

14. Absorption refrigerating apparatus comprising a generator, an absorber and an evaporator interconnected to form a system for circulating a refrigerant, an absorption liquid and an inert gas, means to heat the generator to expel refrigerant from solution therein, and said system including means to circulate gas in counter-flow to liquid refrigerant in the evaporator comprising a conduit in the form of an inverted U forming a part of the circulating system, means to abstract heat from the vaporous refrigerant produced in the generator and from one leg of said U by a fluid outside said apparatus and means to heat the other leg of said U by said fluid and by vaporous refrigerant produced in the generator and by heat from the generator heating means.

15. Absorption refrigerating apparatus comprising a generator, an absorber and an evaporator interconnected to form a system for circulating a refrigerant, an absorption liquid and an inert gas, means to heat the generator to expel refrigerant from solution therein, and said system including means to circulate gas in counter-flow to liquid refrigerant in the evaporator comprising a conduit in the form of an inverted U forming a part of the circulating system, means to abstract heat from the vaporous refrigerant produced in the generator and from one leg of said U by a fluid outside said apparatus and means to heat the other leg of said U by said fluid and by vaporous refrigerant produced in the generator.

16. Absorption refrigerating apparatus comprising a generator, an absorber and an evaporator interconnected to form a system for circulating a refrigerant, an absorption liquid and an inert gas, means to heat the generator to expel refrigerant from solution therein, and said system including means to circulate gas in counter-flow to liquid refrigerant in the evaporator comprising a conduit in the form of an inverted U forming a part of the circulating system, means to abstract heat from the vaporous refrigerant produced in the generator and from one leg of said U by a fluid outside said apparatus and means to heat the other leg of said U by said fluid.

17. An absorption refrigerating apparatus comprising, in combination, a generator, a condenser, an evaporator, an absorber, conduits connecting said generator, condenser, evaporator and absorber and arranged for the circulation of refrigerant therethrough and for the circulation of an inert gas through said evaporator and absorber, one of said conduits being in the form of an inverted U, means for heating said generator to expel vaporous refrigerant therefrom, means for cooling said condenser to liquefy refrigerant therein, and means for heating one leg of said U for producing circulation of the inert gas through said evaporator in counter-flow to the passage of liquid refrigerant therethrough.

18. An absorption refrigerating apparatus comprising, in combination, a generator, a condenser, an evaporator, an absorber, conduits connecting said generator, condenser, evaporator and absorber and arranged for the circulation of refrigerant therethrough and for the circulation of an inert gas through said evaporator and absorber, one of said conduits being in the form of an inverted U, means for heating said generator to expel vaporous refrigerant therefrom, means for cooling said condenser to liquefy refrigerant therein, and means for heating one leg and cooling the other leg of said U for producing circulation of the inert gas through said evaporator in counter-flow to the passage of liquid refrigerant therethrough.

19. An absorption refrigerating apparatus comprising, in combination, an evaporator, an absorber, conduits connecting said evaporator with said absorber and arranged for the circulation of an inert gas therethrough, one of said conduits being in the form of a plurality of inverted U's, means for heating alternate legs of said U's and means for cooling the other legs of said U's to produce circulation of an inert gas through said evaporator and said absorber.

20. An absorption refrigerating apparatus comprising, in combination, an evaporator, an absorber, conduits connecting said evaporator with said absorber and arranged for the circulation of an inert gas therethrough, one of said conduits being in the form of a plurality of inverted U's, means for heating alternate legs of said U's and means for cooling the other legs of said U's to produce circulation of an inert gas through said evaporator in counter-flow to the passage of liquid refrigerant therethrough.

21. Absorption refrigerating apparatus comprising a generator, an absorber and an evaporator interconnected to form a system for circulating a refrigerant, an absorption liquid and an inert gas, means for heating the generator to expel refrigerant from solution therein, and said system including means for circulating inert gas through said evaporator and said absorber comprising a conduit in the form of a plurality of inverted U's forming a part of the circulating system, means for heating alternate legs of said U's by heat from the generator heating means and means for cooling the other legs of said inverted U's.

22. Absorption refrigerating apparatus comprising a generator, an absorber and an evaporator interconnected to form a system for circulating a refrigerant, an absorption liquid and an inert gas, means for heating the generator to expel refrigerant from solution therein, and said system including means for circulating inert gas through said evaporator in counter-flow to liquid refrigerant in the evaporator comprising a conduit in the form of a plurality of inverted U's forming a part of the circulating system, means for heating alternate legs of said U's by heat from the generator heating means and means for cooling the other legs of said inverted U's.

In testimony whereoef I have affixed my signature.

CARL GEORG MUNTERS.

CERTIFICATE OF CORRECTION.

Patent No. 1,841,293.    Granted January 12, 1932, to

CARL GEORG MUNTERS.

It is hereby certified that error appears in the printed specification of the above numbered patent requiring correction as follows: Page 3, line 19, for the word "inwardly" read upwardly; same page, line 86, claim 3, strike out the words "the vapor produced in the generator to" and insert instead in an ascending leg of said system in, and in line 113, claim 4, for the misspelled compound word "counter-curent" read counter-current; and that the said Letters Patent should be read with these corrections therein that the same may conform to the record of the case in the Patent Office.

Signed and sealed this 29th day of March, A. D. 1932.

M. J. Moore,
Acting Commissioner of Patents.

(Seal)